United States Patent
Herr

[11] 3,807,584
[45] Apr. 30, 1974

[54] LOAD STATION MATERIAL TRANSFER SYSTEM

[75] Inventor: Edward J. Herr, Battle Creek, Mich.

[73] Assignee: Clark Equipment Company, Buchanan, Mich.

[22] Filed: Sept. 24, 1971

[21] Appl. No.: 183,494

[52] U.S. Cl. .................... 214/38 D, 214/84, 198/96
[51] Int. Cl. ............................................ B65g 41/02
[58] Field of Search ................ 214/38 D; 193/35 S; 198/96, 97, 93, 89

[56] References Cited
UNITED STATES PATENTS

| | | | |
|---|---|---|---|
| 3,075,659 | 1/1963 | Sylvester | 214/16.4 A |
| 3,655,075 | 4/1972 | Carder, Stampe, Frassetto & Bell | 214/38 D |
| 1,020,746 | 3/1912 | Dehler | 198/157 |
| 3,169,652 | 2/1965 | Ewell | 214/38 D |

*Primary Examiner*—Gerald M. Forlenza
*Assistant Examiner*—Kenneth Noland
*Attorney, Agent, or Firm*—Reising, Ethington and Perry

[57] ABSTRACT

This is an automatic storage system load station material transfer apparatus with a movable material support which can be moved into engagement with a stationary material support for the transfer of material therebetween. Each of the material supports has sets of rollers in a common plane with the rollers in the movable support so arranged as to straddle the rollers in the stationary support when the supports are in engagement with each other to thereby permit the common support of the load. The transfer of the load is facilitated by locking the rollers on the support to which the load is being transferred while allowing the rollers on the support from which the load is being transferred to roll freely thereby frictionally holding the load on the support to which it is desired to transfer the load. Thereafter the movable support is moved out of enegagment with the stationary support and thus the transfer of the load from one support to the other is completed. This device is useful on stacker load stations of automatic storage systems of the type shown in U.S. Pat. No. 3,536,209 Burch et al. The restriction of the rotation of the rollers may be accomplished either by brakes or by one-way brakes.

3 Claims, 4 Drawing Figures

PATENTED APR 30 1974 3,807,584

INVENTOR
EDWARD J. HERR
BY Lewis J. Lamm
ATTORNEY

INVENTOR
EDWARD J. HERR
BY Lewis J. Lamm
ATTORNEY

LOAD STATION MATERIAL TRANSFER SYSTEM

BACKGROUND AND SUMMARY OF THE INVENTION

This invention relates to apparatus for transferring material from one support to another and more particularly, relates to load station material transfer means for automatic storage systems. This invention may be used for transferring material from a fixed material support to a fixed position on a movable material support for pickup by an automatic material handling system. In the present invention, the fixed material support may be the end of a conveyor used for conveying palletized or packaged material.

The movable support straddles the fixed support to facilitate the transfer of the material to the movable support which latter support may have openings therein to permit stacker forks to engage the material and remove same.

In the present invention, the supporting surfaces on both the movable and fixed support consists of a series of rollers, the upper surfaces of which lie in a common plane. The rollers forming the supporting surface on the movable material support normally straddle the rollers forming the supporting surface on the stationary support. In the preferred embodiment, at least one roller on each of the members rolls freely in one direction only, and is locked against rotation in the other direction so as to permit the ready transfer of material from one set of rollers to the other set by merely projecting the movable support under the load and then retracting this support.

While in the preferred embodiment the locking and unlocking of the rollers is accomplished by one-way brakes, other locking means may be used without departing from the scope of this invention. For example, if it is desired to permit the transfer of material both ways on the material transfer system, it may be desirable to use selectively actuated frictional or positive locking means operated as necessary to permit the two-way transfer of material.

It is an object of the present invention to provide a means for horizontally transferring material between a stationary and a movable support by the horizontal actuation of the movable support.

It is another object of the present invention to provide a material position transfer means which simultaneously relocates the material to a fixed preselected position.

It is a further object of the present invention to provide a material transfer apparatus which is dependable, simple to operate and relocates the material to a fixed position.

Further objects of the present invention will become apparent upon inspection of the drawing and specification and will be pointed out in the claims.

BRIEF DESCRIPTION OF THE PREFERRED EMBODIMENT

Referring to the drawing, FIG. 1 is a top view of the apparatus;

Figure 4:
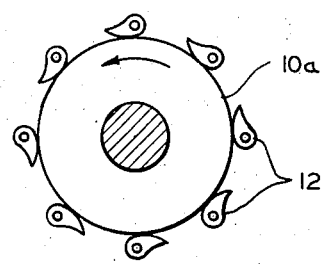

FIG. 4 schematically shows a one-way brake to permit one-way rotation of the rollers.

Referring to the drawings, 2 is a stationary material support, 4 is a movable material support, both of which are mounted on base 6 with 4 moving on track 8 also mounted on base 6.

The stationary material support 2 has rollers 10 mounted thereon at least a portion of which are restricted to one-way operation by one-way brake cams 12.

The movable material support 4 has material supporting rollers 14, 16, 18, 20, 22 and 24 spaced from each other to permit their straddling rollers 10 and to permit the insertion of forks on automatic storage system stackers. This movable material support also has material guides 26, 28, 30, 32, 34 and 36 to position the material from a random position 38 to a fixed position 40. Rollers 18 and 24 may have one-way brake cams thereon to aid in the transfer of the material. 4 is carried by supporting wheels 42 mounted in tracks 8.

SPECIFIC DESCRIPTION OF THE PREFERRED EMBODIMENT

Figure 1:
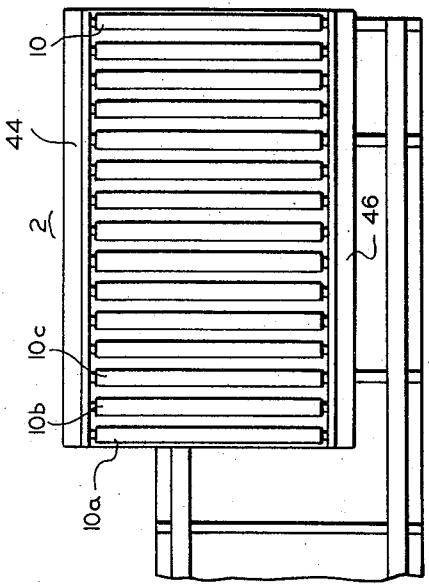
Figure 1:
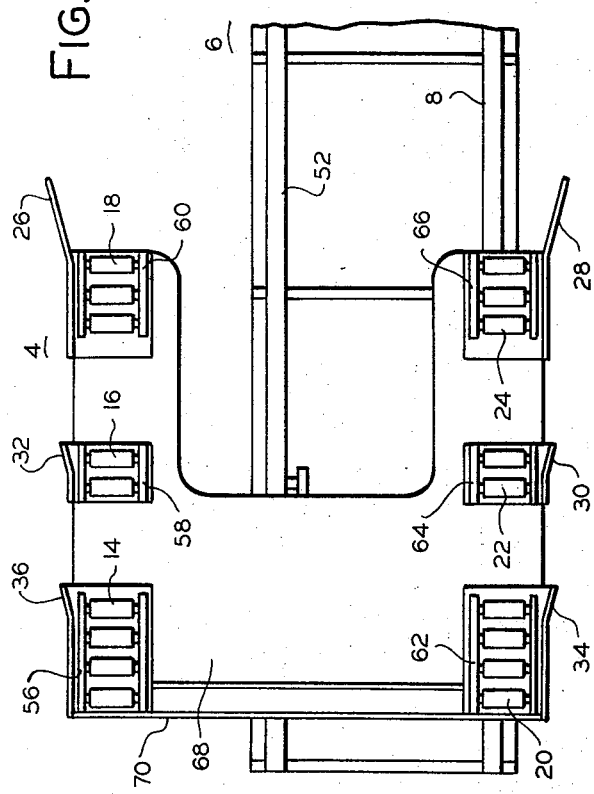
Figure 2:
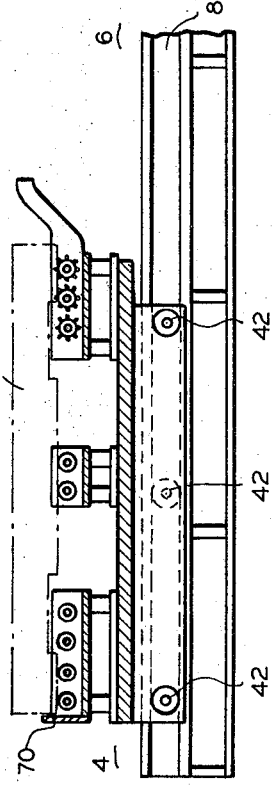
FIG. 2 is a side view of the apparatus.
Figure 3:
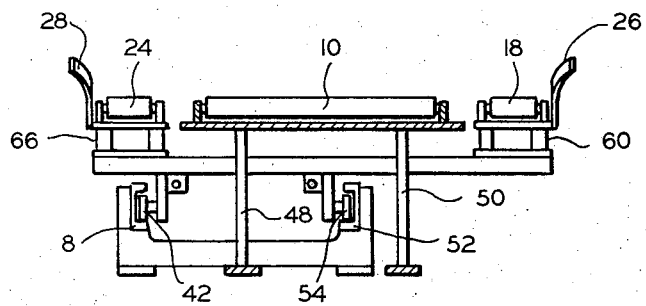
FIG. 3 is an end view of the apparatus.

Referring now to FIGS. 1, 2 and 3 of the material transfer apparatus, the stationary material support is shown generally as 2. This support consists of rollers 10 rotatably mounted on side rails 44 and 46 with the rollers 10a, 10b and 10c free to rotate in one direction only. The assembly consisting of side rails 44 and 46 with the rollers 10 mounted thereon is held in a fixed position by legs 48 and 50.

The movable support shown generally as 4 has six sets of short rollers mounted on mating brackets. The four rollers 14 with flanged guide 36 are mounted on bracket 56, the two rollers 16 with guide 32 are mounted on bracket 58, the three rolls 18 having one-way clutches 12 with guides 26 are mounted on bracket 60. Referring to the other side of the movable material support, the four rolls 20, together with guide 34 are mounted on bracket 62; the two rolls 22, together with guide 30 are mounted on bracket 64; and the three one-way rotating rolls 24, together with material guide 28 are mounted on bracket 66. These brackets are laterally separated sufficiently to allow the sets of rollers on 4 to straddle the rollers 10 on 2. The brackets are spaced longitudinally sufficiently to allow the material handling forks of a stacker or other apparatus to pass transversely therebetween and thus remove the material 40 from the movable material support 4. The brackets containing the rollers on 4 are mounted on a plate 68 which has attached thereto supporting carriage wheels 42 and 54. These wheels 42 and 54 ride in tracks 8 and 52, respectively, which are mounted in the supporting frame 6.

Referring to FIG. 4, one-way brakes are shown as a way of selectively locking the rollers 10a, 10b and 10c and the sets of rollers 18 and 24. These one-way brakes are shown for illustrative purposes only, and frictional or positive locking means may be used to selectively stop the rotation of the above-mentioned rollers without departing from the scope of the present invention.

OPERATION OF THE PREFERRED EMBODIMENT (Transfer of Material From Fixed Support to Movable Support)

Referring to the figures in the drawings, the following is a description of the operation of the apparatus transferring material from the stationary material support to the movable material support.

In one particular embodiment of the present invention, the stationary material support 2 is the end of a gravity or power roller conveyor with the material on the conveyor being deposited at a final position 38.

At this point of the operation, the movable material support 4 is empty and is moved to the right toward 2 by either electrical or air-actuated power means (not shown). As shown in FIG. 3, the material support rollers on 4 straddles the material support rollers on 2 and, since they are at the same height as the rollers 10, they pass underneath the material in the position 38. While 4 is moving to the right, all rollers are free to rotate in the direction urged except the rollers 10a, 10b, and 10c which are locked against rotation by the one-way brake cams 12 and thus hold the material in the position 38. As the movable material support passes into juxtaposition with the fixed or stationary material support 2, the guides 26, 28, 30, 32, 34 and 36 guide the material transversely until at the end of the stroke the material is located longitudinally against the stop 70 and located transversely by the above-mentioned guide members. At this point in the operation, the material is in the position 38, but supported jointly by the rollers on both the stationary and the movable material support and fixed in a horizontal plane by guide members 26 through 36, and the stop 70.

As the movable support 4 is retracted, the sets of rollers 18 and 24 are restricted from clockwise rotation as viewed in FIG. 2 and thus frictionally engage the material being supported. The rolls 10 including 10a, 10b and 10c have freedom of counterclockwise rotation as shown in FIG. 2 and, therefore, the material is free to move off the support 2 from the position 38 on 2 to the position 40 on 4. The material ends up in fully-transferred position, as shown at 40 on FIG. 2 and may be removed therefrom by material handling equipment having forks which are inserted transversely between the sets of rollers on 4.

OPERATION OF PREFERRED EMBODIMENT (Transfer from Movable Material Support to Stationary Material Support)

In the modification of this apparatus designed for transferring material from both the stationary material support to the movable material support and vice versa, the one-way brake cams 12 are replaced with selectively actuated one-way brakes of common design which selectively restrict rotation of the rollers while transferring material from one support to the other. Any desired, commonly known frictional or positive brake means may be used and selectively actuated to permit the desired horizontal direction of movement of the material during transfer between the material support members.

When the illustrated apparatus is used to transfer material from the movable support member to the stationary support member, the material is initially placed on the position 40 on the movable support member 4. The support member 4 is then actuated to the right as shown in FIGS. 1 and 2 until the material support rollers on 4 are straddling the rollers 10 on 2 and the material is jointly supported by the rollers on both of the material support assemblies. The material is then in the position shown on 38, FIG. 2.

The support member 4 is then retracted to the left with all rollers having freedom of rotation except the rollers 10a, 10b and 10c which are restricted against counterclockwise rotation by the equivalent of one-way brake cams 12. These rollers, being restricted from rotation, frictionally engage the material and hold it in the position 38 on the fixed material support 2 as the movable support 4 is retracted to the position shown in FIGS. 1 and 2. The fixed support 2 having no stop or other restriction preventing the material from moving to the right in the position 38 allows the material to be removed to the right by either gravity or ejected in that direction by the next load of material moved from the movable material support 4 to the fixed support 2.

It may be seen that the present invention may be used to transfer material from a conveyor to an automatic material handling apparatus or from automatic material handling apparatus to a conveyor selectively by proper energization of brakes.

Having thus described the preferred embodiment of the present invention, it will, of course, be understood that various changes may be made in the form, details, arrangement and proportion of the parts without departing from the scope of the invention which consists of the matter shown and described herein and set forth in the appended claims.

I claim:

1. A material transfer system comprising; a first material support including a first frame structure, plural rollers mounted on said first frame structure and having parallel axes adapted to support a piece of material to be transferred, a second material support including a second frame structure, plural rollers mounted on the second frame structure and having parallel axes adapted to support a piece of material to be transferred, the plural rollers on the first and second frame structures being disposed in a common plane and one of said frame structures being movable toward and away from the other in a predetermined path perpendicular to the axes of said rollers to transfer a piece of material therebetween, the plural rollers of the first material support being arranged on the first frame structure in two sets with the sets being spaced apart in the direction of said axes with an opening between the two sets of rollers, the plural rollers of the second material support being arranged on the second frame structure in one set which is in alignment with the opening between the two sets of rollers on the first frame structure, whereby the two sets of rollers straddle the one set of rollers upon movement of one of the frame structures toward the other, one way brake on one of the frame structures for locking at least one of the rollers thereon against rotation in only one direction, said one way brake being ineffective when the rollers turn in the other direction to thereby permit free rotation of the roller in the other direction, whereby a piece of material on one material support is transferred to the other whenever the frame structures are moved toward each other with said one roller being freely rotatable in the direction urged by engagement with the piece of material and then moved away from each other with said one roller being locked against rotation in the direction urged by engagement with the piece of material.

2. The invention as defined in claim 1, including a track defining said predetermined path, said second frame structure being in a fixed position adjacent said track and said first frame structure being movable along said track to move the two sets of rollers into and out of straddling relation with the one set of rollers for transfer of a piece of material.

3. The invention as defined in claim 2, including guide means comprising a pair of arms mounted on the first frame structure and extending divergently toward the second frame structure, one of said arms being outboard of the first set of rollers and the other being outboard of the second set of rollers, whereby a piece of material on the second material support will be urged laterally to position it with respect to the first frame member by engagement with one of the divergently extending arms as said first frame member approaches the second frame member.

* * * * *